A. WELSH.
MACHINE FOR SOWING SEED.
APPLICATION FILED AUG. 16, 1909.
971,331.
Patented Sept. 27, 1910.
2 SHEETS—SHEET 1.
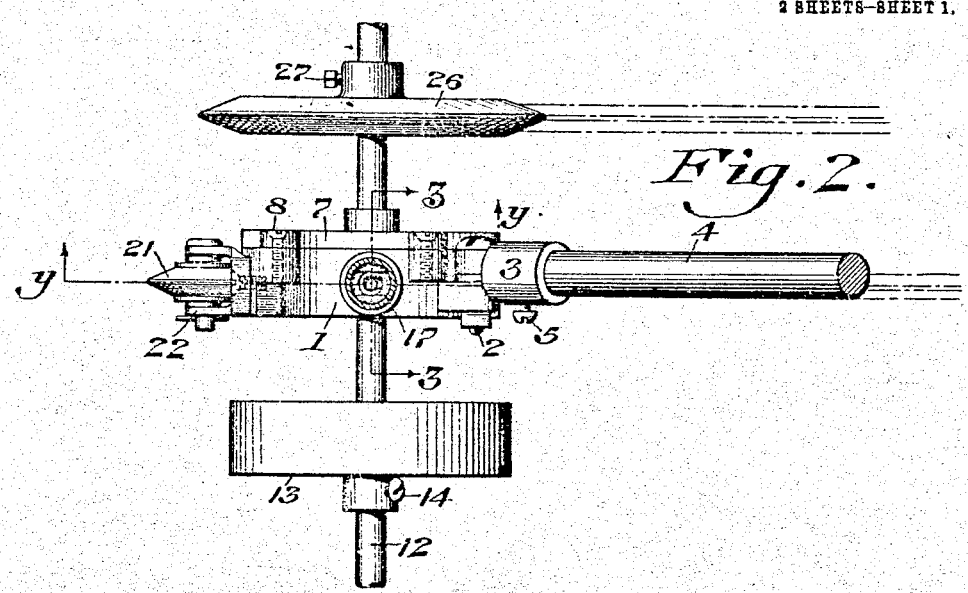
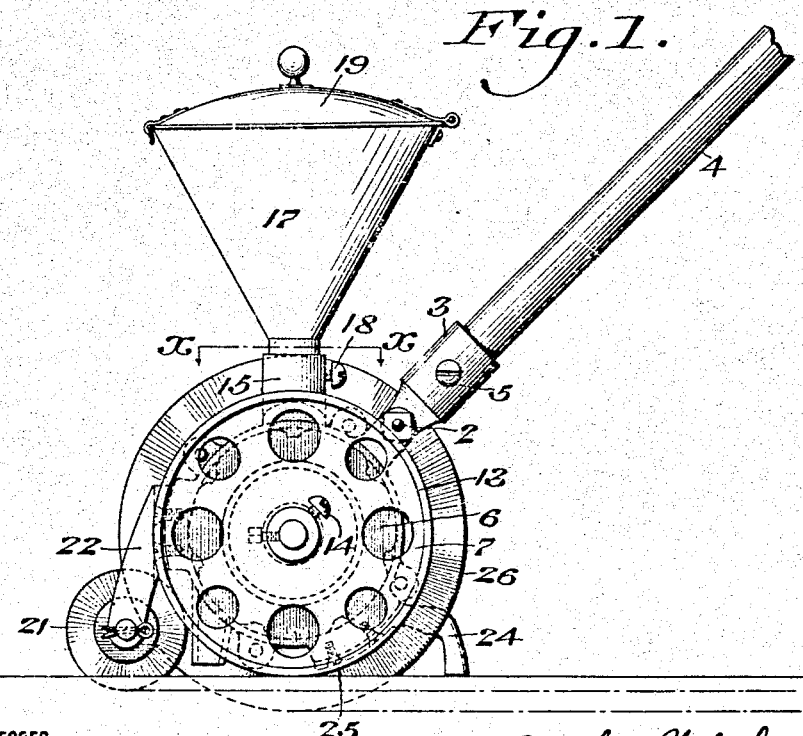
WITNESSES
L. Douville,
P. F. Nagle.
Archer Welsh, INVENTOR
BY Friedensheim & Faubau&
ATTORNEYS

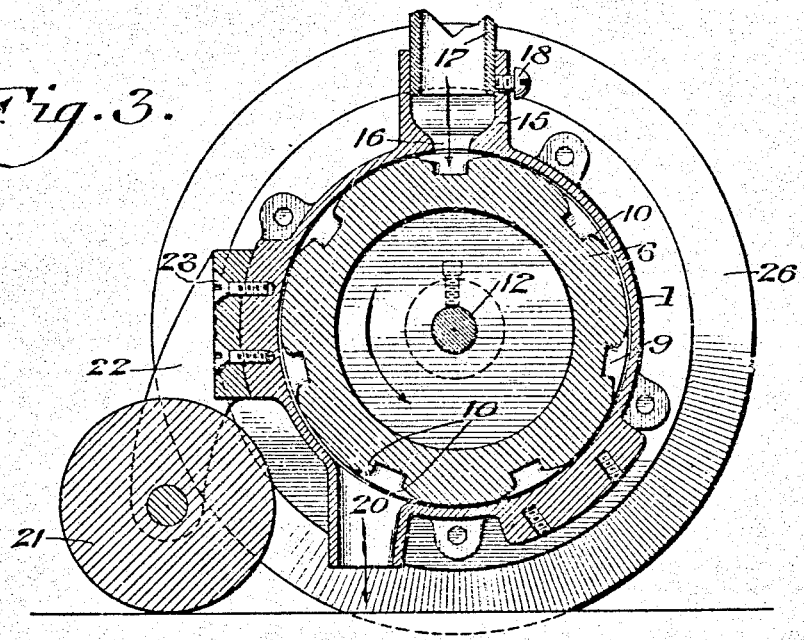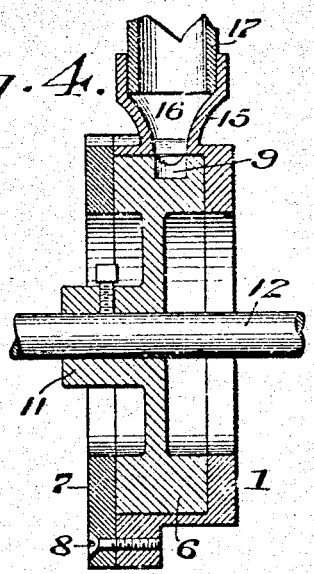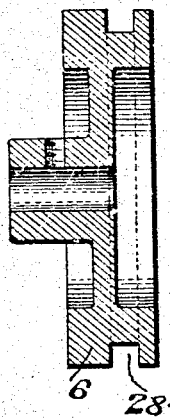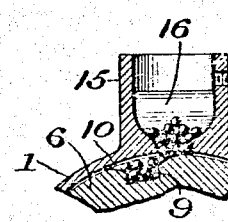

UNITED STATES PATENT OFFICE.

ARCHER WELSH, OF BELLMOR, NEW JERSEY.

MACHINE FOR SOWING SEED.

971,331.  Specification of Letters Patent.  Patented Sept. 27, 1910.

Application filed August 16, 1909. Serial No. 512,948.

*To all whom it may concern:*

Be it known that I, ARCHER WELSH, a citizen of the United States, residing at Bellmor, in the county of Camden, State of New Jersey, have invented a new and useful Machine for Sowing Seed, of which the following is a specification.

My present invention relates to a novel machine for sowing seed which is especially adapted for use in plant houses, nurseries and similar places or in the field, and the object of my invention is to devise an apparatus, wherein the seed will be accurately planted in the ground at the proper intervals apart and to eliminate the waste of seed which occurs in prior devices with which I am familiar.

A further object of my invention is to distribute the seed at the desired intervals apart and in any desired quantities to desired depths in the soil and provide means for marking and lining out the rows and for covering the seed after the same has been deposited in the soil.

To the above ends my invention consists of a novel construction of a planting device wherein means are provided for marking the furrow, planting the seed at predetermined intervals apart, covering the seed and flattening the surface of the soil above the seed.

It further consists of a novel construction of a seed planter wherein a hopper is provided which delivers the seed to pockets located in the rotatable drum whereby the seed will be distributed at predetermined intervals apart.

It further consists of a novel construction of a drum wherein the pockets are arranged and constructed in such a manner with relation to the inlet and outlet of the casing in which the drum is mounted that there is no liability of the seed becoming crushed or broken when the drum is rotated in either direction.

My invention further consists of a novel construction of a casing in which is mounted a shaft carrying a marking wheel, a drum and a supporting wheel, the casing being provided with a suitable hopper and means being provided for making the furrow in which the seed is to be deposited and to cover the seed after the same has been deposited in the furrow.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a machine for sowing seed, embodying my invention. Fig. 2 represents a section on line $x$—$x$, Fig. 1. Fig. 3 represents a section on line $y$—$y$, Fig. 2, on an enlarged scale. Fig. 4 represents a section on an enlarged scale on line $z$—$z$, Fig. 2. Fig. 5 represents a sectional view of a portion of my device showing more clearly the manner in which the seed is discharged from the hopper into the pockets in the rotatable drum, the section being taken on line $y$—$y$ Fig. 2 and certain parts being removed for clearness of illustration. Fig. 6 represents a sectional elevation of a modified form of drum.

Similar numerals of reference indicate corresponding parts in the figures.

Referring to the drawings:—1 designates a casing to which is pivotally supported by means of a fastening device 2, a socket 3, in which latter is removably secured a handle 4 by means of a set screw or equivalent fastening device 5. The casing 1 is chambered out to receive a drum or disk 6 which is retained in place by means of a preferably apertured plate 7 secured to the casing 1 by any suitable fastening device 8.

The drum 6 is rotatably mounted within the casing 1 and is provided with any desired or predetermined number of pockets 9, the opposite sides of which are cut away or inclined, as indicated at 10, the purpose of which will hereinafter appear. The drum 6 is provided with a hub 11, in which is journaled a shaft 12 and on this shaft is mounted a supporting wheel 13, the outer periphery of which may be of any desired width, said wheel being adjustably mounted on the shaft 12 in any desired manner and in the present instance I have shown the same secured to the shaft 12 by means of the set screw 14.

The casing 1 is provided with an enlargement 15 which is chambered out to form a passage 16 for the seed, said inlet passage terminating in close proximity to the outer periphery of the drum 6.

17 designates a hopper which is secured with respect to the enlargement 15 in any suitable manner and in the present instance the same is shown as secured in position by means of a suitable fastening device 18. The hopper if desired may have secured thereto, a cover 19.

20 designates a discharge outlet to which the seeds are fed from the pockets 9 in the drum 6, and deposited in the furrow formed by the furrow disk 21, which latter is mounted in arms 22 secured to the casing 1 by means of suitable fastening device 23.

In order that the ground will be properly marked off, I provide a marking disk 26, adjustably mounted on the shaft 12 by means of a set screw or equivalent device 27.

In order to provide for properly covering the seed after it has been deposited in the ground at the desired intervals apart, I provide an arm 24 of any desired contour, such arm being suitably secured to the casing 1 by means of fastening devices 25.

In the embodiment seen in Fig. 6, I have shown a modified form of drum, wherein I have dispensed with the pockets 9, and I provide a drum 6 with an annular groove 28 on its periphery, the purpose of which is to provide continual feed for the seed passing from the hopper 17 substantially the same as would be given in case the pockets of the periphery of the drum were in very close proximity to each other.

The operation of my novel machine for sowing seed will now be readily understood and is as follows:—The seed which it is desired to plant is placed in the hopper 17 and the cover 19 closed. The machine then by means of the handle 4 is moved either forwardly or backwardly over the ground which is to be planted and the furrow in which the seed is to be planted will be properly marked out by means of the marking disk 26, it being understood that the furrow in which the seed is being deposited is formed by the furrow disk or member 21 which travels in one of the furrows marked out by the marking disk 26.

As the machine is moved either forwardly or rearwardly, it will be apparent that owing to the supporting wheel 13 which travels on the ground and the contact of the marking wheel 26 with the ground that the shaft 12 will be rotated thereby rotating in unison therewith the drum 6 so that the seed which is deposited in the pockets 9, as clearly shown in Fig. 5, will be carried around with the drum and when such pocket carrying seed comes into register with the discharge outlet 20 the seed contained in said pocket will pass through the discharge outlet 20 and be deposited in the furrow formed by the furrow disk 21. It will be apparent that seed will be deposited at predetermined distances apart in an accurate and reliable manner when the machine is being moved either forwardly or rearwardly.

Assuming that the machine is being moved forwardly, after the seed is deposited in the furrow, the covering member 24 will cause the seed deposited in the furrow to be covered with the soil so that when the next row is being planted with seed, the broad surface of the supporting wheel 13 will bear upon the soil above the seed which has been planted and properly pressed down the soil above the seed.

It has been found in practice that if the pockets 9 extend to the periphery of the drum in such a manner as to have sharp corners there is liability of the seed becoming crushed as the pocket passes beneath the inlet 13 and I therefore preferably in practice cut away or inclined the pocket on opposite sides so that there will be no liability of the seed becoming crushed when the machine is being moved either forwardly or rearwardly in order to deposit the seed in the ground. In case it is desired to plant a continuous row of seeds the drum shown in Fig. 6 will be employed in which case the seed entering the inlet 6 will pass around the groove 28 and discharge through the discharge outlet 20 into the furrow, it being apparent that the ground will be marked out, furrowed, the seed covered and the ground rolled in precisely the same manner as I have heretofore described.

In case it is desired to plant seed of different sizes or at different intervals apart the plate 7 would be removed thereby permitting removal of the drum 6 and a drum would be substituted therefore in which the pockets were of the desired dimensions and in which the pockets would be of the predetermined distance apart so that the seeds could be deposited at any desired intervals from each other, it being apparent that the drum may vary in accordance with the requirements and conditions arising in practice. It will also be apparent that the pockets in the periphery of the drum may be so located that substantially a continuous row of seed may be planted similar to what would be accomplished in case the annular groove 28 is employed. The width of the furrow may be varied by laterally adjusting the marking disk and the supporting wheel on the shaft 12.

It will now be apparent that I have devised a novel and useful construction of a machine for sowing seed which embodies the features of advantage enumerated as desirable in the statement of the invention and the above description, and while I have in the present instance shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent is:—

1. In a seed planter, a driving shaft, a supporting wheel mounted thereon, a marking disk mounted on said shaft, a drum mounted on said shaft intermediately of said wheel and disk and provided with seed retaining pockets on its periphery, an inclosing casing in which said drum is loosely mounted and having a delivery spout at its lower portion and an inlet passage at its upper portion, a furrow disk rotatably carried by said casing and in alinement with the delivery spout, and means for adjusting the relative position of said supporting wheel and marking disk to vary the width of the furrow.

2. In a seed planter, a driving shaft, a supporting wheel mounted thereon, a marking disk mounted on said shaft, a drum mounted on said shaft intermediately of said wheel and disk and provided with seed retaining pockets on its periphery, the circumferential edges of said pockets being inclined, an inclosing casing loosely mounted on said drum and having a delivery spout at its lower portion and an inlet passage at its upper portion, a furrow disk rotatably carried by said shaft and in alinement with the delivery spout, and means for adjusting the relative position of said supporting wheel and marking disk to vary the width of the furrow, in combination with means carried by the casing for covering the deposited seeds with soil.

3. In a seed planter, a driving shaft, a supporting wheel mounted thereon, a marking disk mounted on said shaft, a drum mounted on said shaft intermediately of said wheel and disk and provided with seed retaining pockets on its periphery, the circumferential edges of said pockets being inclined, an inclosing casing loosely mounted on said drum and having a delivery spout at its lower portion and an inlet passage at its upper portion, a furrow disk rotatably carried by said shaft and in alinement with the delivery spout, the rim of the supporting wheel being of greater width than the furrow, and means for adjusting the relative position of said supporting wheel and marking disk to vary the depth of the furrow.

4. In a seed planter, the combination of a casing, of a feed drum mounted therein and provided with seed retaining pockets on its periphery, the opposite edges of said pockets being inclined and said casing being provided with an inlet and discharge passage, said inlet passage having the walls near its inner periphery converging to substantially the same diameter as the seed retaining pockets.

5. In a seed planter, a driving shaft, a feed drum adjustably mounted thereon and provided with seed retaining pockets on its outer periphery, having their circumferential edges inclined, a casing loosely mounted on said drum and provided with inlet and discharge passages coöperating with said seed retaining pockets, a plate secured to said casing to maintain said feed drum in operative relation with respect to said inlet and discharge passages, a supporting wheel carried by said shaft, a marking disk carried by said driving shaft, and means for adjusting the relative longitudinal position of said supporting wheel and disk on the driving shaft to vary the depth of the furrow.

ARCHER WELSH.

Witnesses:
H. S. FAIRBANKS,
C. D. McVAY.